Jan. 13, 1942.  D. A. BENNER  2,269,753
TOOL CAR
Filed March 4, 1940
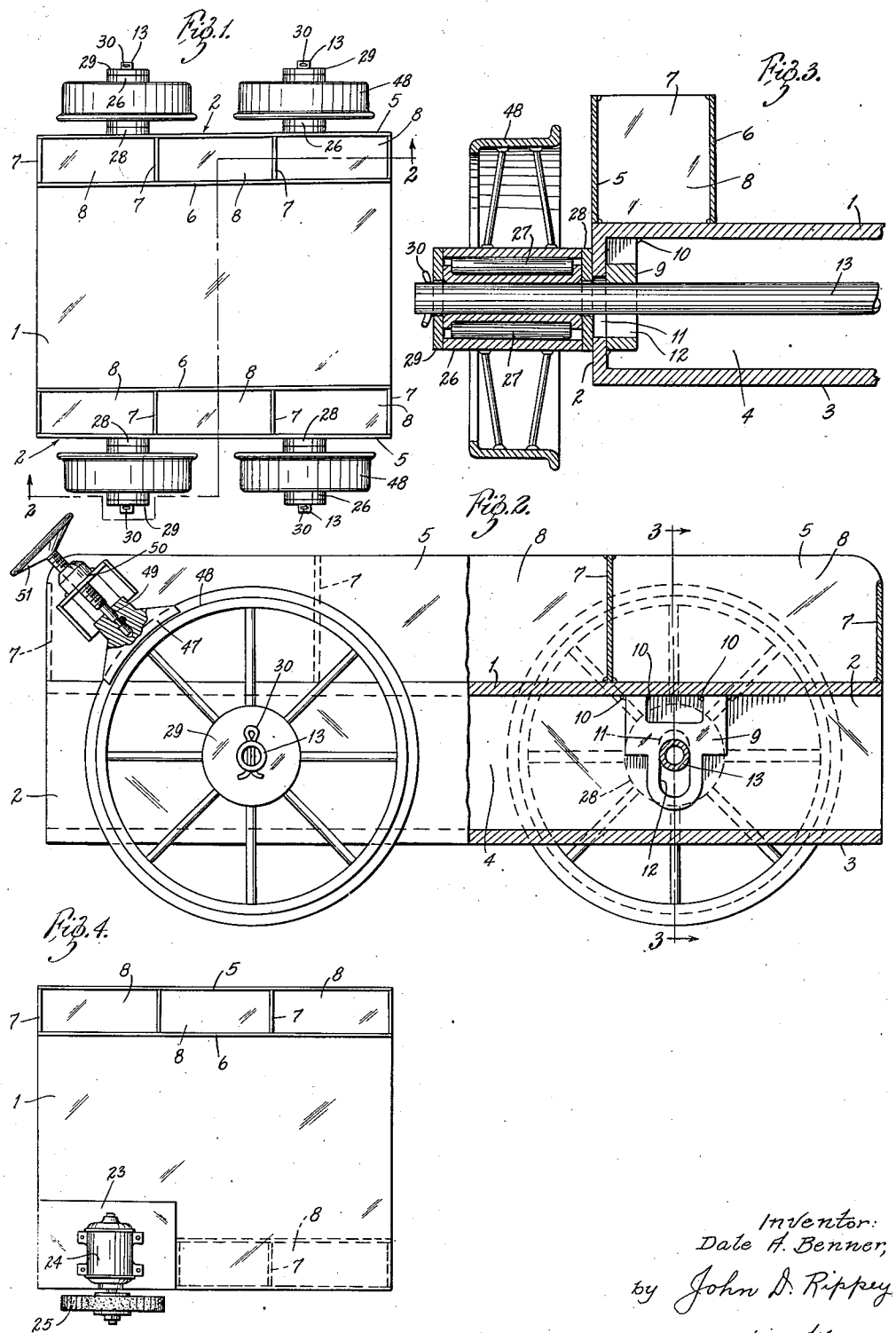
Inventor:
Dale A. Benner,
by John D. Rippey
his Attorney.

Patented Jan. 13, 1942

2,269,753

UNITED STATES PATENT OFFICE 2,269,753

TOOL CAR

Dale A. Benner, Alton, Ill.

Application March 4, 1940, Serial No. 322,069

2 Claims. (Cl. 105—162)

This invention relates to a tool car; and has special reference to a car or carriage adapted to move along rails to carry tools, equipment and other devices for use in and about mines and other places where tracks or rails are available for supporting the car or carriage.

Objects of the invention are to provide a car or carriage of comparatively light weight and of sturdy construction which is of simplified and durable arrangement and form, and is convenient to use and operate; to provide a car or carriage having a bed provided with receptacles or compartments of novel form and arrangement adapted to retain different tools or appliances to be used selectively and wherever needed; and to provide a novel brake mechanism or device and means for operating the same to apply brake shoes to selected ones of the wheels that support the car.

Another object of the invention is to provide an improved device of the character herein disclosed, designed and adapted to be applied to various uses and embodying many novel and advantageous features of arrangement and construction made apparent from the following description read in connection with the annexed drawing, in which—

Fig. 1 is a plan view of a tool car or carriage made in accordance with the present invention.

Fig. 2 is an enlarged view of the car equipped with a brake, a part of the car body being shown in vertical longitudinal section approximately on the line 2—2 of Fig. 1.

Fig. 3 is an enlarged vertical cross-sectional view through one of the supporting wheels approximately on the line 3—3 of Fig. 2.

Fig. 4 is a plan view of the carriage bed having a grinding machine mounted thereon.

The car body is of rigid construction and may be composed principally of metallic walls and other metallic parts, and comprises a floor 1, vertical side members 2, and a lower supporting member 3. The supporting member 3 may be composed of a plate or may be otherwise formed as desired. The parts 1 and 3 are rigidly attached to the side members 2 and cooperate therewith to form a compartment 4 which may be open at one end, or at both ends as shown. Longitudinal wall portions 5 may be extended upwardly in continuation of the side members 2 and in rigid connection therewith to cooperate with other longitudinal walls 6 rigidly attached to and rising from the floor 1 inwardly from the walls 5, and with transverse walls 7 secured between the walls 5 and 6 to form a number of separate compartments 8 along one side of the vehicle body. These walls 5, 6 and 7 may be duplicated at the opposite side of the vehicle body to form a series of compartments at each side of said body, as shown in Fig. 1, if desired.

Bearing brackets 9 are rigidly attached to opposite sides of the vehicle body, preferably within the compartment 4 and against the side members 2. These bearing brackets may be attached to the floor 1 and to the side members 2 by welds 10, or otherwise as desired. The opposite side members 2 are formed with complementary slots 11, and the bearing brackets 9 are formed with openings 12. Axles 13 extend horizontally across the compartment 4, through the openings 12 and slots 11, and laterally beyond the opposite side members 2. The slots 11 extend above the openings 12 so that the entire weight of the vehicle body and its contents is supported by the bearing brackets 9 mounted on the axles 13.

As shown in Fig. 4, one of the compartments 8 may be covered by a removable and replaceable base plate 23 having an electric motor 24 mounted thereon for driving a tool grinder 25. This grinder may be used to grind various tools and devices used about the work which the vehicle is designed to serve.

The hubs 26 of the wheels are preferably mounted on roller bearings 27 on the extended ends of the axles 13. The hubs 26 and the bearings are held from longitudinal displacement by any abutment washers 28 and outer washers 29 secured on the axles by cotter pin fasteners 30, or otherwise as desired. The axles 13 may be of tubular form.

A brake device is shown in Fig. 2, and comprises a brake shoe 47 movable into and out of engagement with one of the wheel rims 48. The brake shoe is rotatively supported by a shaft 49 screwed through a supporting bracket 50 attached to one of the walls 5 and having a hand wheel 51 secured to its outer end. By turning the shaft 49 in one direction, the brake shoe 47 will be set against the adjacent wheel rim 48; and, by turning said shaft in the opposite direction, the brake shoe will be released. A similar brake device may be mounted adjacent to one or more of the wheels, as desired.

It should now be apparent that this invention constitutes means for attaining all of its intended objects and advantages, and that the parts thereof may be varied otherwise than as specifically shown and described without departure from the nature and principle thereof. I do not restrict myself to the identical forms of arrangement and construction shown, but what I claim and desire to secure by Letters Patent is:

1. In a car of the character described, a metallic car body composed of a floor extending the full length and width of said body, vertical downwardly extended side walls rigid with the longitudinal sides of said floor and having axle receiving slots therein, a lower supporting member rigid with the lower edges of said side walls and separated downwardly from said floor by an intervening space forming a compartment having an open end for insertion and withdrawal of articles, axles extending through said slots and through said compartment for supporting the car body, bearing brackets for said axles rigid with said floor and said side walls within said compartment and supporting the car body substantially out of contact with said axles, said axles and brackets leaving said compartment otherwise unobstructed throughout the length and width of said body, and wheels mounted on said axles.

2. In a car of the character described, a metallic car body comprising a floor extending the full length and width thereof, downwardly extended side wall members rigid with the side edges of said floor and having axle receiving slots, a lower supporting member integrally united with the lower edges of said side wall members and cooperating therewith and with said floor to form a longitudinal open compartment extending the full length of the floor and having an open end, axles extending through said slots and through said compartment below said floor between said open end and the opposite end of the car body, wheels mounted on the ends of said axles for supporting the car body, and supporting brackets rigid with said side wall members within said compartment and mounted on said axles and having openings through which said axles extend and by which said axles are held out of contact with the upper ends of said slots in said side wall members, said axles and brackets leaving said compartment otherwise unobstructed.

DALE A. BENNER.